United States Patent
Akiyama et al.

(10) Patent No.: US 10,528,468 B2
(45) Date of Patent: Jan. 7, 2020

(54) STORAGE CONTROLLING APPARATUS, COMPUTER-READABLE RECORDING MEDIUM HAVING STORAGE CONTROLLING PROGRAM STORED THEREIN, AND STORAGE CONTROLLING METHOD

(71) Applicant: FUJITSU LIMITED, Kawasaki-shi, Kanagawa (JP)

(72) Inventors: Shigeru Akiyama, Kawasaki (JP); Yasuhiro Ogasawara, Fujisawa (JP); Tsukasa Matsuda, Kawasaki (JP); Hidetoshi Nishi, Nagano (JP); Hitoshi Kosokabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 15/249,515

(22) Filed: Aug. 29, 2016

(65) Prior Publication Data
US 2017/0068618 A1 Mar. 9, 2017

(30) Foreign Application Priority Data
Sep. 3, 2015 (JP) .................................. 2015-173683

(51) Int. Cl.
*G06F 12/0804* (2016.01)
*G06F 12/0871* (2016.01)
(Continued)

(52) U.S. Cl.
CPC ...... *G06F 12/0804* (2013.01); *G06F 12/0868* (2013.01); *G06F 12/0871* (2013.01);
(Continued)

(58) Field of Classification Search
CPC ............. G06F 12/0804; G06F 12/0871; G06F 12/0868
See application file for complete search history.

(56) References Cited

U.S. PATENT DOCUMENTS 5,524,234 A * 6/1996 Martinez, Jr. ....... G06F 12/0804
711/141
5,918,069 A * 6/1999 Matoba ............... G06F 12/0835
710/21
(Continued)

FOREIGN PATENT DOCUMENTS

JP 5-303528 11/1993
JP 7-168730 A 7/1995
(Continued)

OTHER PUBLICATIONS

Japanese Office Action dated Feb. 19, 2019 for corresponding Japanese Patent Application No. 2015-173683, with English Translation, 6 pages.

*Primary Examiner* — Charles Rones
*Assistant Examiner* — Tian-Pong Chang
(74) *Attorney, Agent, or Firm* — Fujitsu Patent Center

(57) ABSTRACT

A storage controlling apparatus includes a processor, wherein the processor: controls a first counter configured to count, among data stored in a cache memory and relating to an access request, a number of data which are not written in storage volumes of a target of the access request, for each storage volume; determines, in response to reception of a first access request, whether or not a first ratio of a counter value of the first counter to a number of data allocated already to the cache memory into a first storage volume exceeds a first threshold value, the counter value of the first counter corresponding to the first storage volume which is a target of the first access request; and performs a write back process of data from the cache memory into the first storage volume where the first ratio exceeds the first threshold value.

12 Claims, 13 Drawing Sheets

(51) Int. Cl.
    *G06F 12/123*     (2016.01)
    *G06F 12/0868*     (2016.01)

(52) U.S. Cl.
    CPC ...... *G06F 12/124* (2013.01); *G06F 2212/281* (2013.01); *G06F 2212/312* (2013.01); *G06F 2212/604* (2013.01)

(56) References Cited

U.S. PATENT DOCUMENTS

| | | | |
|---|---|---|---|
| 7,636,814 B1* | 12/2009 | Karr | G06F 12/0804 711/143 |
| 8,402,226 B1* | 3/2013 | Faibish | G06F 12/0804 710/52 |
| 2012/0124294 A1* | 5/2012 | Atkisson | G06F 11/108 711/135 |
| 2014/0359226 A1* | 12/2014 | Pan | G06F 12/0873 711/135 |
| 2014/0365725 A1* | 12/2014 | Barrell | G06F 11/1076 711/113 |
| 2014/0379990 A1* | 12/2014 | Pan | G06F 12/0804 711/135 |
| 2015/0161043 A1 | 6/2015 | Tsuchiyama et al. | |
| 2016/0085674 A1* | 3/2016 | Sterns | G06F 12/0804 711/143 |

FOREIGN PATENT DOCUMENTS

| | | |
|---|---|---|
| JP | 9-297710 A | 11/1997 |
| JP | 2005-258789 | 9/2005 |
| JP | 2015-111334 | 6/2015 |

* cited by examiner

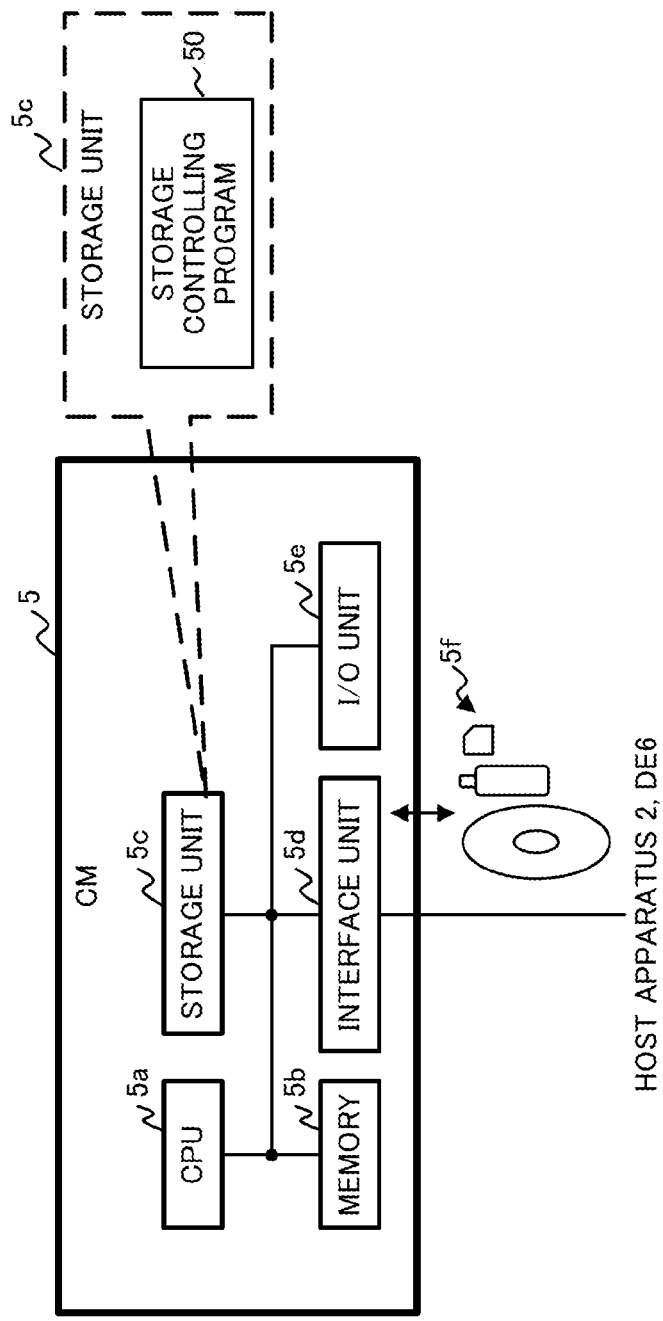

STORAGE CONTROLLING APPARATUS, COMPUTER-READABLE RECORDING MEDIUM HAVING STORAGE CONTROLLING PROGRAM STORED THEREIN, AND STORAGE CONTROLLING METHOD

CROSS-REFERENCE TO RELATED APPLICATION

This application is based upon and claims the benefit of priority of the prior Japanese Patent Application No. 2015-173683, filed on Sep. 3, 2015, the entire contents of which are incorporated herein by reference.

FIELD

The present technology relates to a storage controlling apparatus, a computer-readable recording medium having a storage controlling program stored therein and a storage controlling method.

BACKGROUND

In recent years, a storage apparatus which configures a great number of logical volumes in a Redundant Array of Independent Disks (RAID) has spread by increase of the storage capacity of physical disks (storage devices) which configure the RAID.

As such a storage apparatus, an apparatus is available in which I/O (Input/Output) requests such as writing requests for a plurality of logical volumes in the same RAID are processed in parallel. As a reason why a parallel process of I/O requests can be performed, it is listed that the performance of hardware of an interface between a host apparatus and a storage apparatus is enhanced or that the redundancy is provided by a plurality of paths.

It is to be noted that, in a storage apparatus, data relating to an access request such as an I/O request is stored into a cache memory and a write back process is performed in which dirty data before execution of write back is discharged (written out) from the cache memory to a physical disk by the write back method, for example. The write back process can be performed, for example, periodically or in the case where capacity shortage (cache depletion) of a free cache memory occurs and therefore a cache region is released.

[Patent Document 1] Japanese Laid-Open Patent Application No. 2005-258789

[Patent Document 2] Japanese Laid-Open Patent Application No. 05-303528

In a storage apparatus, a plurality of logical volumes which are an access target of a write request issued from a host apparatus are sometimes allocated to one physical disk. In this case, if the free capacity of the cache memory becomes short, then write back of dirty data is performed. However, if a plurality of the write back processes are executed by a parallel process of write requests, then the processing performance of the physical disk sometimes becomes insufficient with respect to the data amount relating to the write back.

Consequently, time is taken to secure the free capacity of the cache memory and a delay may occur in allocation of the cache memory with respect to the write request in the writing process.

It is to be noted that, not only in the writing process but also in an access request, for example, in a readout request, a delay may possibly occur in allocation of a cache memory with respect to an I/O request similarly as in the writing process. This is because, in a readout process relating to a readout request, if the free capacity of a cache memory into which data of a readout target to be readout from a logical volume is to be stored becomes insufficient, then write back occurs.

SUMMARY

According to an aspect of embodiments, a storage controlling apparatus includes a processor; wherein the processor: controls a first counter configured to count, among data stored in a cache memory and relating to an access request, a number of data which are not written in storage volumes of a target of the access request, for each storage volume; decides, in response to reception of a first access request, whether or not a first ratio of a counter value of the first counter to a number of data allocated already to the cache memory into a first storage volume exceeds a first threshold value, the counter value of the first counter corresponding to the first storage volume which is a target of the first access request; and performs a write back process of data from the cache memory into the first storage volume where the first ratio exceeds the first threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 13 is a view depicting an example of a hardware configuration of a CM according to the embodiment.

DESCRIPTION OF EMBODIMENTS

Figure 1:
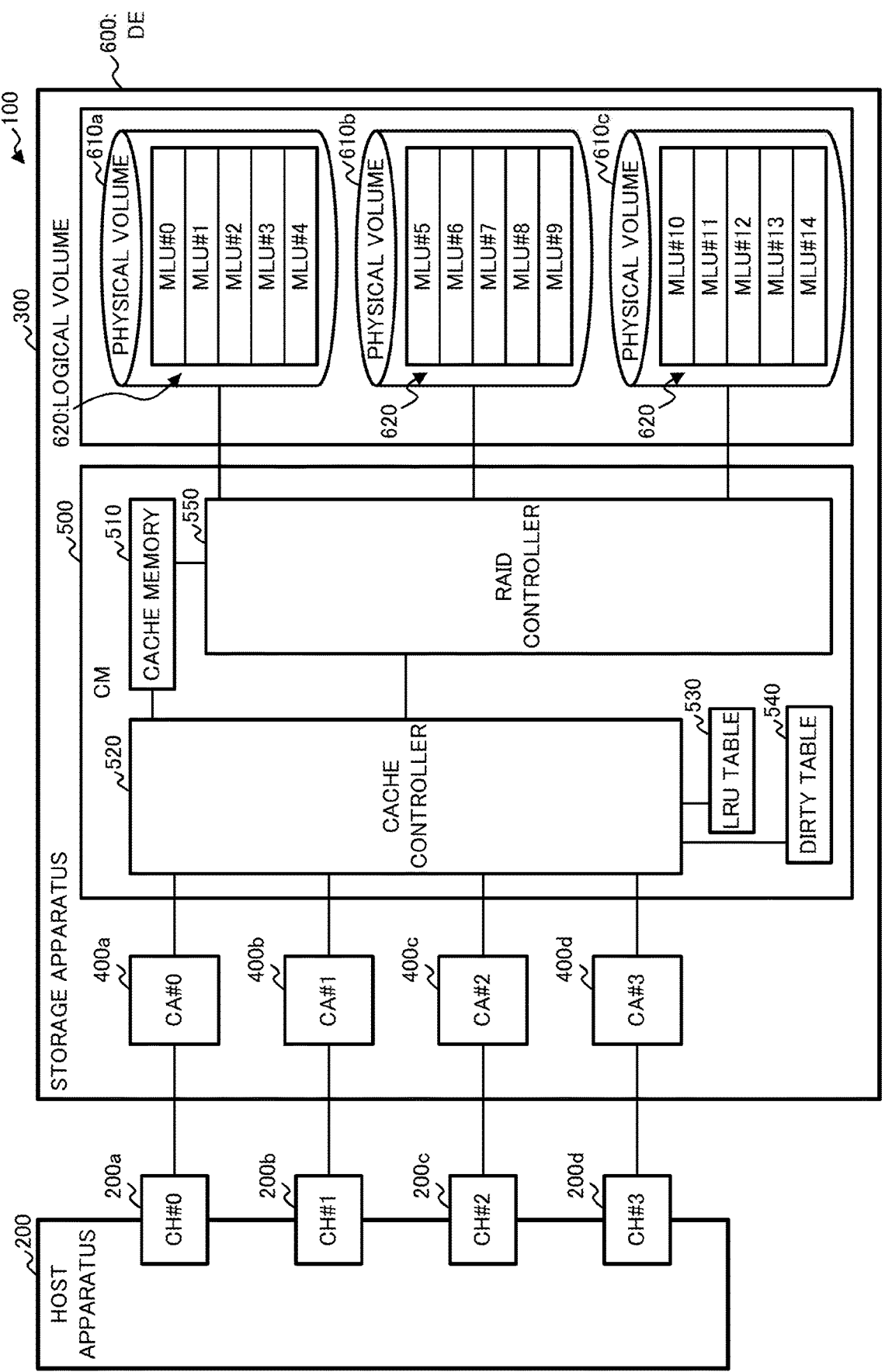
FIG. 1 is a view depicting an example of a configuration of a storage system according to a comparative example.

In the following, an embodiment of the present technology is described with reference to the drawings. It is to be noted that the embodiment described below is exemplary at all, and there is no intention to exclude various modifications or technical applications not presented explicitly below. In other words, the present embodiment can be carried out in various modified forms without departing from the spirit and scope of the technology. It is to be noted that, in the drawings referred to in the description of the embodiments, unless otherwise specified, elements to which like reference characters are applied denote like or similar elements.

[1] Comparative Example

First, a comparative example with one embodiment is described. FIG. 1 is a view depicting an example of a configuration of a storage system 100. As exemplified in FIG. 1, the storage system 100 includes a host apparatus 200 and a storage apparatus 300.

In the storage system 100, hardware of an interface between the host apparatus 200 and the storage apparatus 300 is enhanced in performance, and a plurality of buses are used for an I/O request to provide redundancy. Consequently, the storage system 100 can perform parallel processing of access requests.

As exemplified in FIG. 1, the host apparatus 200 includes Channels (CHs) 200a to 200d as an example of a plurality of interfaces. Further, the storage apparatus 300 includes Channel Adapters (CAs) 400a to 400d as an example of a plurality of interfaces, a Controller Module (CM) 500 as an example of a controller, and a Drive Enclosure (DE) 600.

It is to be noted that, from among apparatus each having a reference character represented by a combination of a numeral and an alphabet, those apparatus whose reference characters have a common numeral can have functions similar to each other. In the following description, where those apparatus whose reference characters have a common numeral are not distinguished from each other, each of them is represented merely using the numeral as its reference character. For example, where the CAs 400a to 400d are not distinguished from each other, each of them is represented merely as CA 400.

The DE 600 is an example of an enclosure which incorporates a plurality of physical disks. In the storage apparatus 300, each of physical volumes 610a to 610c can be formed from a plurality of physical disks. The physical volumes 610 may be managed in a unit of a RAID Logical Unit (RLU) set, for example, to a RAID group. In the following description, each physical volume 610 is sometimes referred to as RAID or RLU.

The physical volumes 610a to 610c are an example of a plurality of storage volumes. Each of the physical volumes 610 has been set thereto a plurality of logical volumes 620 which are units recognized by the host apparatus 200 and can store data of the logical volumes 620 therein. As a logical volume, a Mainframe Logical Unit (MLU) is available where the host apparatus 200 is a mainframe.

The CM 500 exemplarily includes a cache memory 510, a cache controller 520 and a RAID controller 550. The cache controller 520 manages a Least Recent Used (LRU) table 530 and a dirty table 540.

The cache controller 520 performs allocation and release of the cache memory 510 in a unit of a cache page by the LRU method on the basis of the LRU table 530 and the dirty table 540 in response to an access request from the host apparatus 200. The cache page has a fixed size of approximately several tens to several hundreds KB (kilobytes), for example, 128 KB.

The LRU table 530 is a table for managing LRU information relating to a discharging order in a unit of a cache page from a storage region of the cache memory 510. Further, the dirty table 540 has set therein information indicative of a write back state of data in a unit of a cache page, in other words, information indicative of whether or not writing into a physical volume 610 of a target of an I/O request has been performed. As an example, in the dirty table 540, one of "DIRTY" representative of data to be written back and "NOT DIRTY" representative of data whose write back is completed or data which is not updated after read out is set for each cache page.

The RAID controller 550 is an example of a controller which controls an access to the DE 600 (physical volumes 610).

Figure 2:
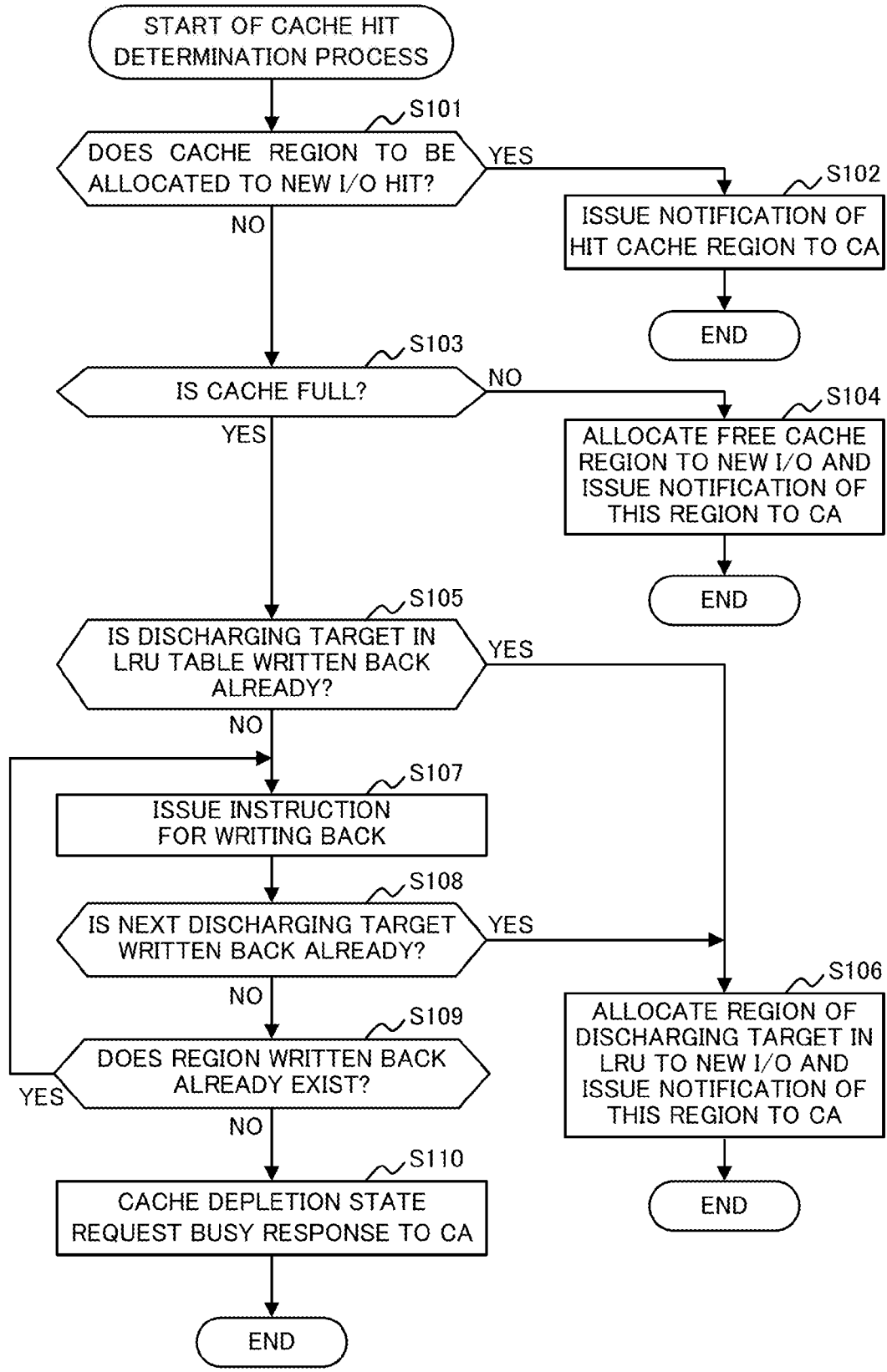
FIG. 2 is a flow chart illustrating an example of operation of a determination process of a cache hit by a cache controller according to the comparative example.

Now, an example of operation for a determination process of a cache hit by the cache controller 520 is described with reference to FIG. 2. The cache controller 520 monitors a use state of the entire cache memory 510 in the storage apparatus 300.

If a command of a new I/O request from the host apparatus 200 is received, for example, from the CA 400a, then the cache controller 520 determines whether or not a cache region to be allocated to the I/O request is hit (step S101). It is to be noted that the determination of a cache hit can be implemented by various known techniques, and detailed description of the same is omitted herein.

If a cache region is hit (Yes route at step S101), then the cache controller 520 notifies the CA 400a of information of the hit cache region (step S102), and the determination process of a cache hit by the cache controller 520 ends therewith.

It is to be noted that the CA 400a notified of information of the cache region instructs the cache controller 520 to write the data (write date) of the I/O request into the region indicated by the notification, and the cache controller 520 writes the write data into the region and returns a response to the CA 400a. Such operation after the determination of a cache hit can be implemented by various techniques, and detailed description of the same is omitted herein.

On the other hand, if the cache region is not hit (No route at step S101), then the cache controller 520 performs confirmation of the depletion state of the cache and determines whether or not the cache is full (step S103). If the cache is not full (No route at step S103), then the cache controller 520 allocates a free cache region to the new I/O request and notifies the CA 400a of information of the allocated cache region (step S104), and the determination process of a cache hit by the cache controller 520 ends therewith.

On the other hand, if the cache is full (Yes route at step S103), then the cache controller 520 performs a release process of the cache for area reserve. In the release process, the cache controller 520 decides whether or not a region of the oldest access in the LRU table 530, or in other words, a region of a discharging target (release target), is written back already (step S105). The cache controller 520 may refer to the dirty table 540 for managing dirty data in the cache memory 510 and determines whether or not the data in the region of the discharging target is not dirty data in this determination.

If the region of the discharging target is written back already, or in other words, if the region is not dirty (Yes route at step S105), then the cache controller 520 allocates the region of the discharging target of the LRU table 530 to the new I/O request and notifies the CA 400a of the region (step S106). Then, the determination process of a cache hit by the cache controller 520 is ended.

On the other hand, if the region of the discharging target is not written back as yet, or in other words, if the data is dirty (No route at step S105), then the cache controller 520 instructs the RAID controller 550 to perform write back. At this time, the cache controller 520 determines, without waiting completion of write back, whether or not write back regarding a region of a next discharging target based on the LRU table 530 has been performed already (step S108).

If the region of the next discharging target is written back already (Yes route at step S108), then the processing advances to step S106. On the other hand, if the region of the next discharging target is not written back as yet (No route at step S108), then the cache controller 520 determines whether or not a region for which write back has been performed exists (step S109). If there exist a different region for which write back has been performed (Yes route at step S109), then the processing advances to step S107.

If there exists no region for which write back has been performed (No route at step S109), then the cache controller 520 determines that the cache is in a depletion state and requests the CA 400a to give a busy response to the host apparatus 200 (step S110). The determination process of a cache hit by the cache controller 520 ends therewith.

Now, an example in which the storage apparatus 300 fails to secure a cache region for an I/O request, or in other words, in which the cache is full and there exists no region which is not dirty, is described with reference to FIGS. 3 to 5.

Figure 3:
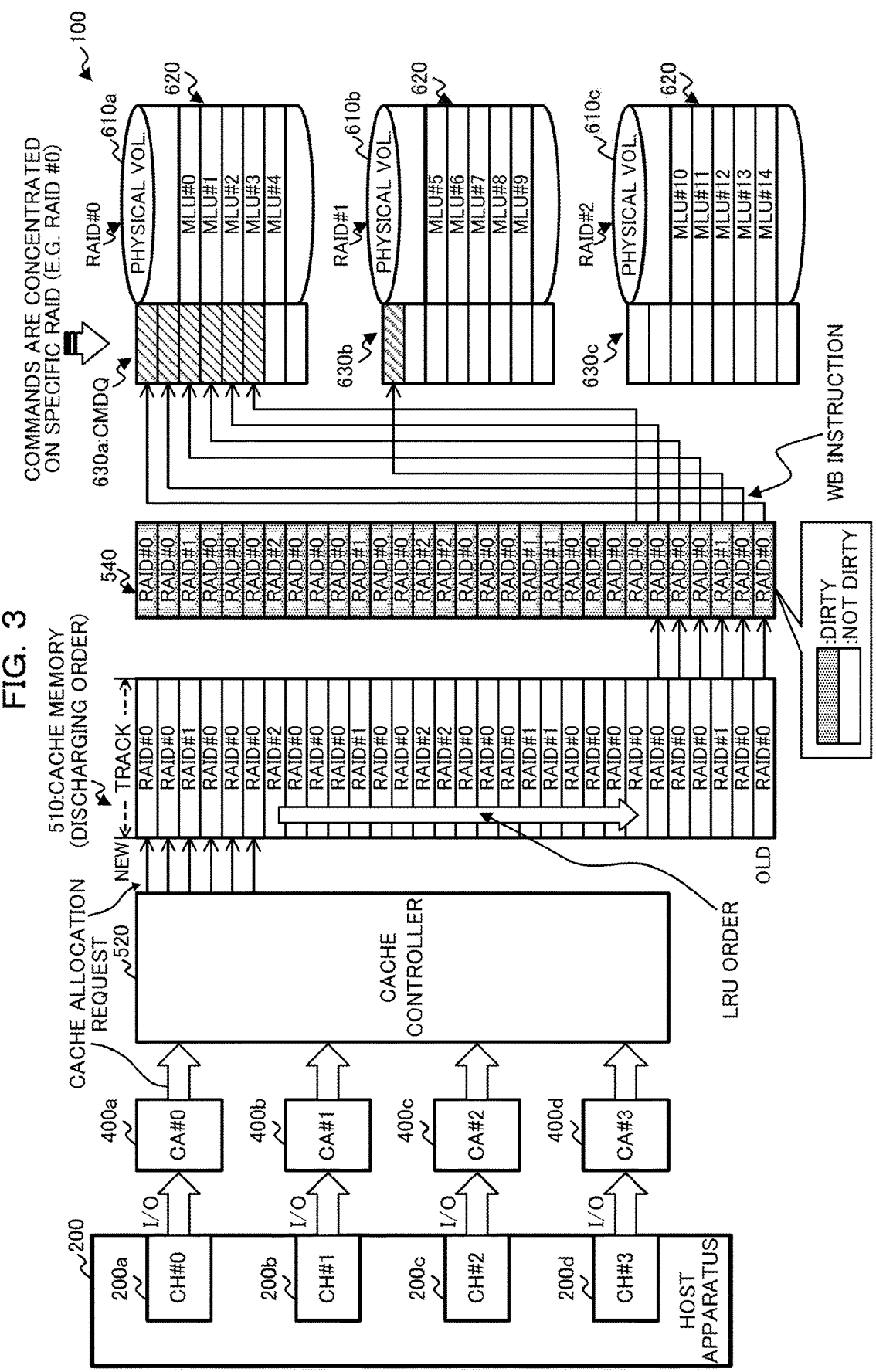
FIGS. 3 to 5 are views illustrating examples in which a storage apparatus according to the comparative example fails to secure a cache region for an I/O request.
Figure 4:
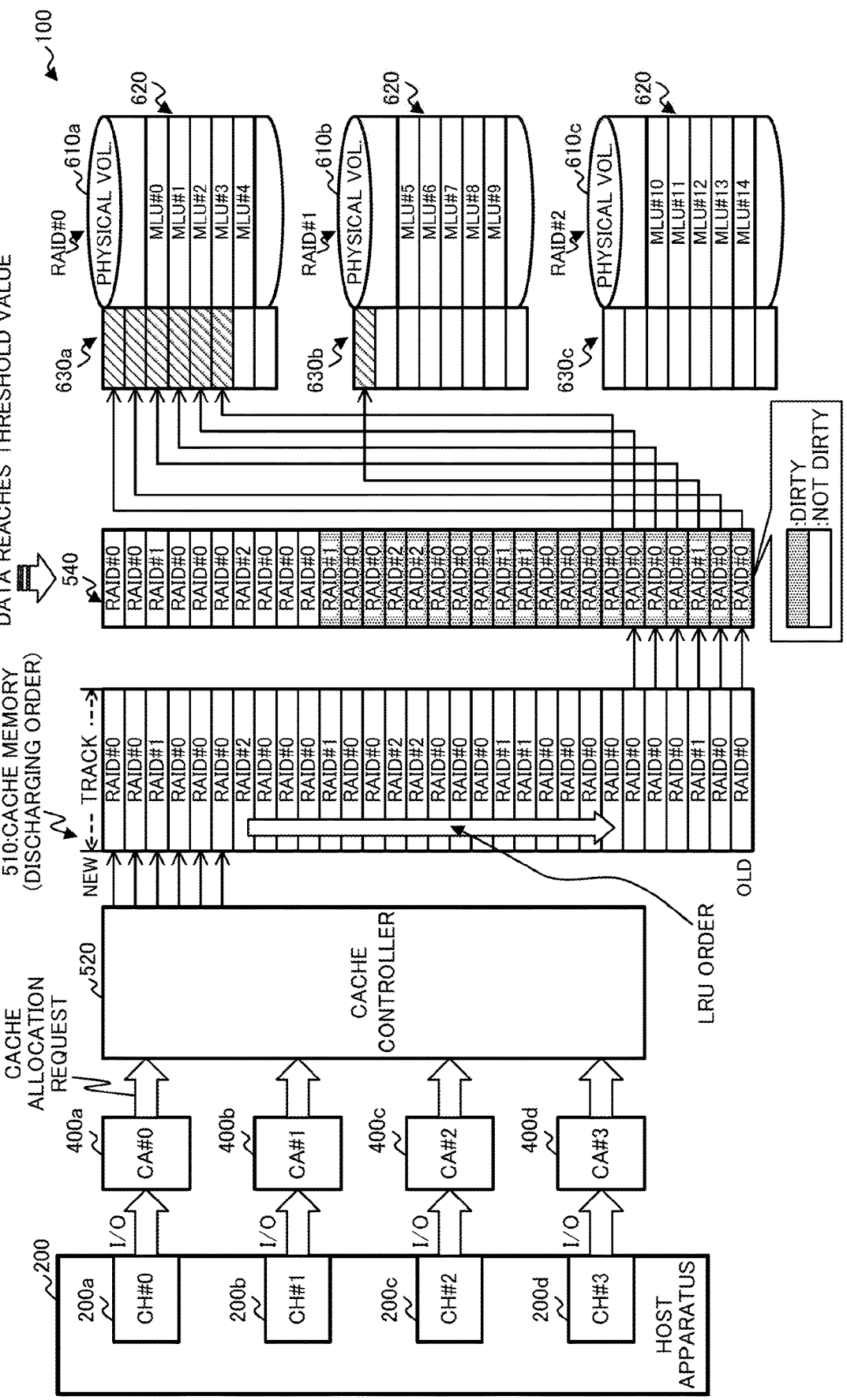
Figure 5:
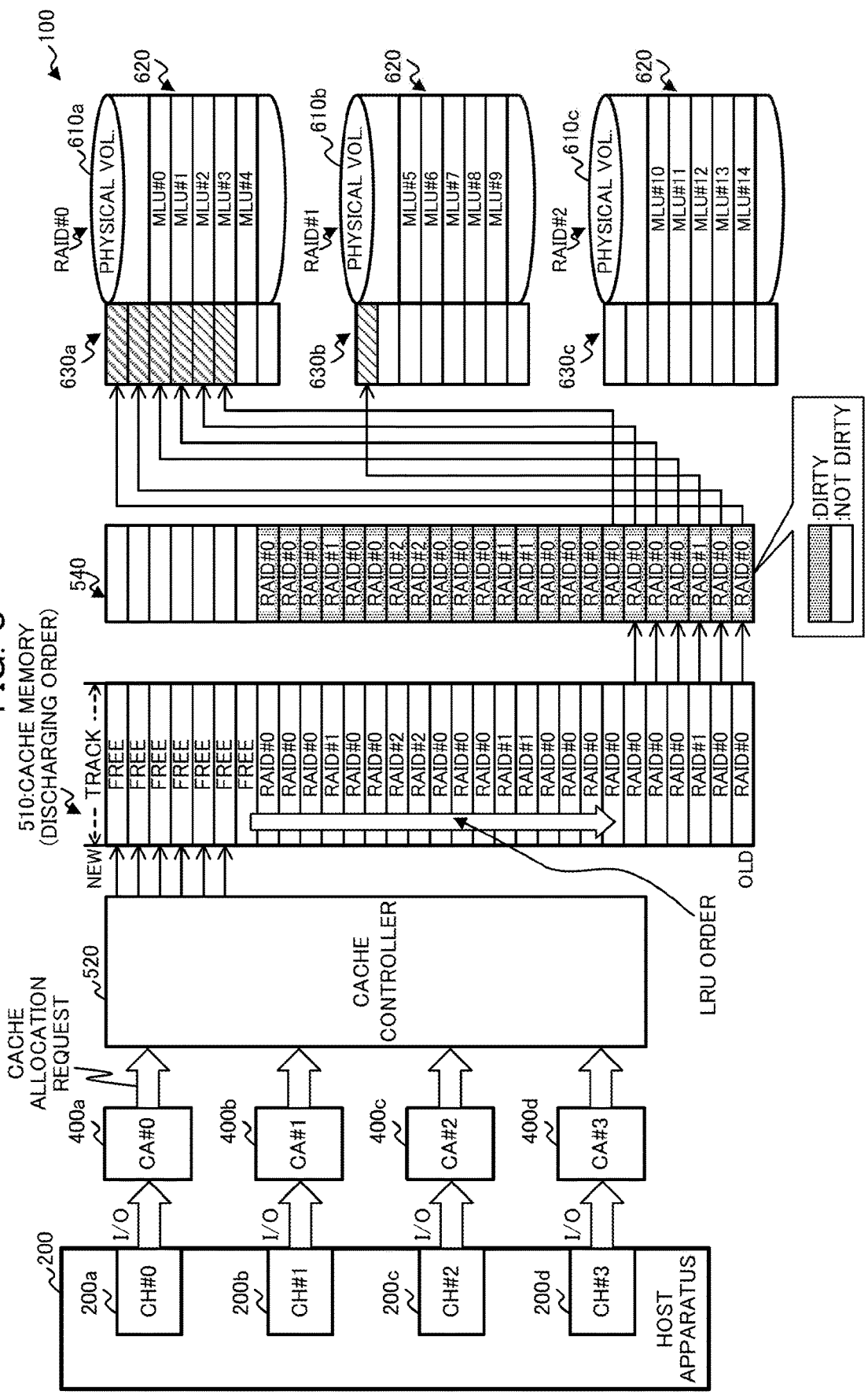

In the cache memory 510 depicted in FIGS. 3 to 5, regions of units of a cache page are indicated in an LRU order indicated by the LRU table 530, or in other words, in an order in which data are discharged from the cache memory 510. It is to be noted that each of Command Queues (CMDQs) 630a to 630c depicted in FIGS. 3 to 5 is an example of a command queue for each of the physical volumes 610 managed by the RAID controller 550.

As depicted in FIG. 3, if an I/O request is issued, for example, from the CH 200a of the host apparatus 200, then the CA 400a of the storage apparatus 300 issues a cache allocation request to the cache controller 520 of the CM 500. When the cache controller 520 is to allocate the cache memory 510 to the I/O request, if a free region does not exist, then the cache controller 520 performs discharge of existing data in accordance with the LRU order. It is to be noted that, if the host I/O is placed into a high load state, then periodical write back fails to follow up cache release, and a depletion state of the cache in which the cache is occupied only by dirty data becomes liable to occur.

Here, the discharge of existing data from the cache memory 510 can include, where the state of the data is "DIRTY", performing a write back process. On the other hand, if the state of the data is "NOT DIRTY", then since the data have already been written back, the write back process is not performed.

Since the write back of dirty data is started using depletion of the cache as a trigger, if the host I/O is in a high load state, then a plurality of I/O requests are placed into a waiting state of a free cache region all at once, and the processing is waited till completion of write back. It is to be noted that, when the write back is completed and a cache region is secured successfully, processing of the host I/O is re-started.

At this time, if the data whose write back is to be performed is concentrated upon (deviated to) one RAID (RLU), for example, upon the physical volume 610a as depicted in FIG. 3, then write back requests exceeding the processing capacity of the RAID are issued.

Consequently, a large amount of write back commands (data) come to stay in the CMDQ 630a, and command processing by the storage device side does not progress sufficiently and a delay occurs with the discharging process of the cache. The delay in the cache discharging process becomes a waiting time period of the host I/O. Thus, in some cases, a process monitoring timer of the host I/O detects a timeout, and a timeout, namely, an event that the host I/O exits in error, can occur in the cache controller 520.

Also a countermeasure may be taken against depletion of a cache memory by varying the write back timing of dirty data in response to the amount of dirty data in the cache memory 510 as depicted in FIGS. 4 and 5.

For example, as depicted in FIG. 4, the cache controller 520 determines the ratio of dirty data in the cache memory 510 and changes the write back interval to perform discharge of the cache in accordance with the LRU before the cache memory 510 is placed into a cache full state.

Meanwhile, in the example of FIG. 5, when the rate of dirty data exceeds a fixed amount, the cache controller 520 starts write back such that a free region is always generated in the cache memory 510. This makes it possible to suppress appearance of awaiting time period for a free region of the cache by write back.

However, in the example of FIG. 4, write back is performed in accordance with the LRU on the basis of the dirty data amount of the entire cache memory 510, and the load on the RAID of the write back destination is not taken into consideration. Therefore, when the write back contends with a RAID operation such as staging, there is the possibility that the performance of the RAID may be degraded. Further, when the LRU suffers from a deviation of the RAIDs, it is difficult to suppress concentration of the load on an RAID, and there is the possibility that the write back command may be delayed.

Further, in the example of FIG. 5, the discharge is performed in accordance with the LRU table 530 and a free region always exists in the cache region. Therefore, it is difficult to utilize the storage region of the cache memory 510 fully by 100% and the cache hit rate may possibly degrade.

[2] Embodiment

[2-1] Example of Configuration of Storage System

In the following, a storage system according to an embodiment against the comparative example described above is described.

Figure 6:
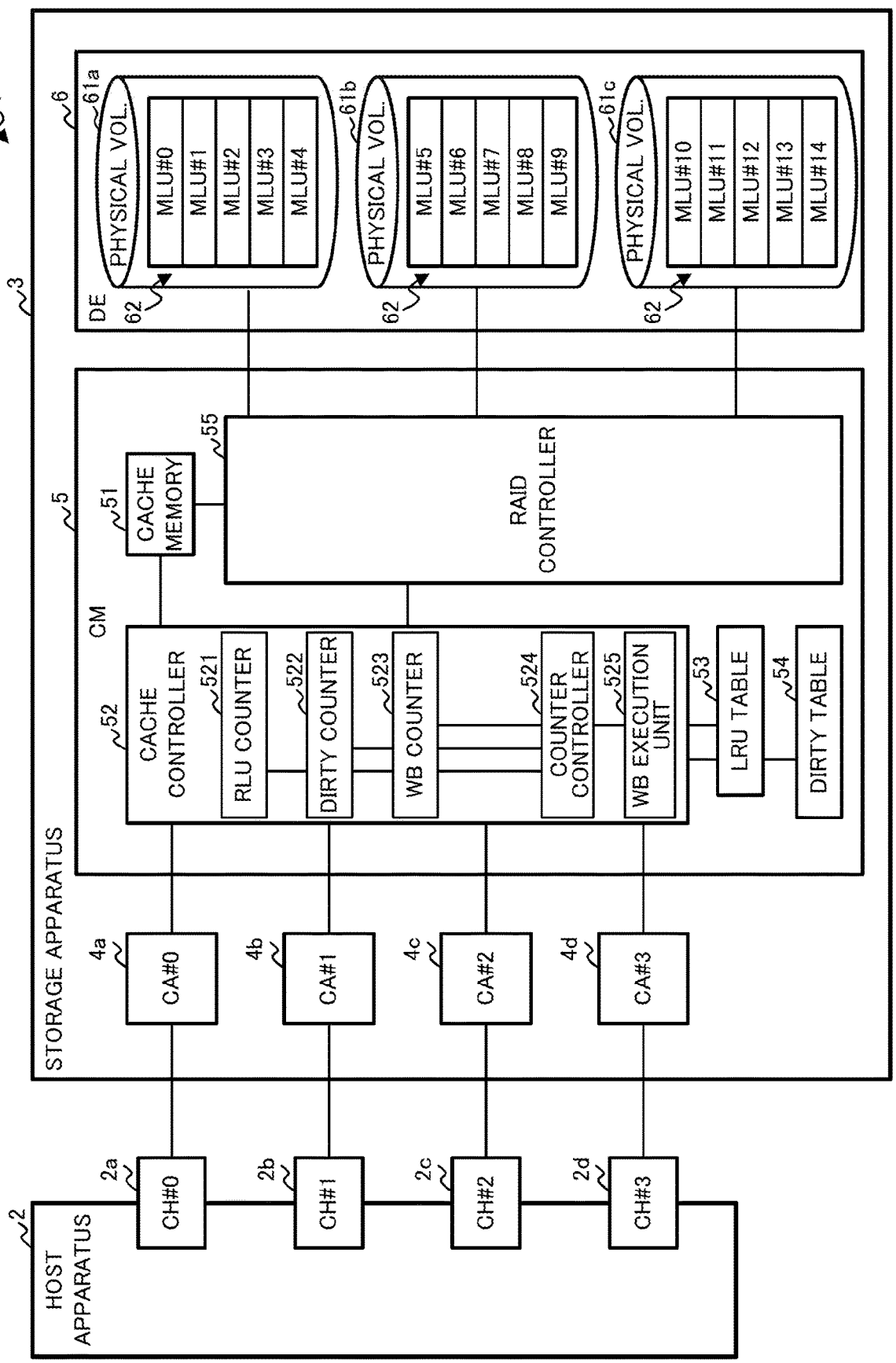
FIG. 6 is a view depicting an example of a configuration of a storage system as an example of an embodiment.

FIG. 6 is a view depicting an example of a configuration of a storage system 1 as an example of the embodiment. As depicted in FIG. 6, the storage system 1 exemplarily includes a host apparatus 2 and a storage apparatus 3. It is to be noted that the storage system 1 may be, for example, at least part of a core system.

The host apparatus 2 is part of a higher-level apparatus that issues various access requests (I/O requests) including a write request and a readout request to the storage apparatus 3. The host apparatus 2 may be an information processing apparatus such as, for example, a server or a personal computer (PC). For example, the host apparatus 2 may be a mainframe or the like. As exemplified in FIG. 6, the host apparatus 2 includes CHs 2a to 2d as an example of a plurality of interfaces.

The storage apparatus 3 includes a plurality of physical disks and provides storage regions of the physical disks to the host apparatus 2. As depicted in FIG. 6, the storage apparatus 3 exemplarily includes CAs 4a to 4d as an example of a plurality of interfaces, a CM 5 as an example of a controller, and a DE 6.

It is to be noted that, from among apparatus each having a reference character represented by a combination of a numeral and an alphabet, those apparatus whose reference characters have a common numeral can have functions similar to each other. In the following description, where those apparatus whose reference characters have a common numeral are not distinguished from each other, each of them is represented merely using the numeral as its reference character. For example, where the CAs 4a to 4d are not distinguished from each other, each of them is referred to simply as CA 4.

The DE 6 is an example of an enclosure in which a plurality of physical disks are incorporated. In the storage apparatus 3, for example, physical volumes 61a to 61c of RAIDs can be formed from a plurality of physical disks. It is to be noted that, as a physical disk, various storage devices such as a magnetic disk apparatus such as a Hard Disk Drive (HDD), a semiconductor drive device such as a Solid State Drive (SSD) and so forth are available.

The physical volumes 61a to 61c are an example of a plurality of storage volumes. Each of the physical volumes 61a to 61c has a plurality of logical volumes 62 allocated thereto and can store data of the logical volumes 62. As a logical volume, where the host apparatus 2 is a mainframe, an MLU is available.

The CM 5 is an example of a storage controlling apparatus which performs control in regard to an access request to a plurality of physical volumes 61 issued from the host apparatus 2. As depicted in FIG. 6, the CM 5 exemplarily includes a cache memory 51, a cache controller 52, an LRU table 53, a dirty table 54 and an RAID controller 55. As the CM 5, an information processing apparatus such as a server or a PC is available.

The cache controller 52 performs allocation and release of the cache memory 51 in a unit of a cache page by the LRU method in response to an access request from the host apparatus 2 on the basis of the LRU table 53 and the dirty table 54. A cache page is a fixed size of approximately several tens to several hundreds KB (kilobytes), for example, 128 KB.

The LRU table 53 is a table for managing LRU information relating to a discharging order in a unit of a cache page from the storage region of the cache memory 51.

The dirty table 54 has set therein information indicative of a write back state of data for each cache page. As an example, the information set to the dirty table 54 includes "DIRTY" and "NOT DIRTY" similar to those in the dirty table 540 (refer to FIG. 7). Here, in the example of FIG. 7, the dirty table 54 includes "WB being executed" for a cache page for which a write back process is being executed for the convenience of illustration. Actually, however, the state of "DIRTY" is set to the cache page. It is to be noted that "WB being executed" is information managed with the LRU table 53.

The RAID controller 55 is an example of a controller for controlling an access to the physical volumes 61a to 61c. The RAID controller 55 can manage a command queue (CMDQ 63: refer to FIG. 7) for each physical volume 61. It is to be noted that, also the physical volumes 61 include a buffer for storing a command inputted thereto and can store a command relating to write back issued from the RAID controller 55 into the buffer.

It is to be noted that the CM 5 can include a Central Processing Unit (CPU) as an example of a processor for implementing various functions as the CM 5, and a Random Access Memory (RAM) as an example of a memory for storing a program to be executed by the processor.

At least part of functions of the cache controller 52 and the RAID controller 55 may be implemented by the CPU executing a storage controlling program stored in the memory. Further, the cache memory 51 described hereinabove may be implemented by at least part of the storage region of the memory. Furthermore, the memory may have a storage region for storing information of the LRU table 53 and the dirty table 54 described hereinabove.

[2-2] Example of Configuration of Cache Controller

In the following, an example of a configuration of the cache controller 52 depicted in FIG. 6 is described.

The cache controller 52 can resolve the deviation of the RLUs in the write back process according to the comparative example described hereinabove by implementing a write back process upon release of a cache region by cache depletion using a configuration and a technique described below in detail.

As depicted in FIG. 6, the cache controller 52 exemplarily includes an RLU counter 521, a dirty counter 522, a write back counter 523, a counter controller 524 and a write back execution unit 525.

The RLU counter 521, dirty counter 522 and write back counter 523 are counters for performing counting for each RLU, for example, for each physical volume 61. The counter controller 524 performs control of the counters 521 to 523, for example, addition or subtraction to or from the counters 521 to 523.

The RLU counter 521 is a counter for recording the number of data allocated to the cache memory 51 for each RLU. In other words, the RLU counter 521 is an example of a third counter which counts the number of data allocated to the cache memory 51 for each physical volume 61.

As an example, the counter controller 524 adds, when the cache controller 52 receives an I/O request, for example, a write request or a readout request, from the host apparatus 2 and allocates a cache region to the I/O request, the allocated data number to the RLU counter 521. Further, as an example, the counter controller 524 subtracts, when the cache controller 52 releases a cache region allocated to an I/O request, the number of data to be released from the RLU counter 521. The counter value of a target of addition and subtraction is a counter value corresponding to the RLU (for example, a physical volume 61) of a target of allocation or release of data.

The dirty counter 522 is a counter for recording the number of data included in a write request from among data staged in the cache memory 51 for each RLU. In other words, the dirty counter 522 is an example of a first counter for counting the number of data whose writing into a physical volume 61 of a target of an access request stored in the cache memory 51 is not performed from among data relating to the access request for each physical volume 61.

As an example, the counter controller 524 adds, when the cache controller 52 receives a write request from the host apparatus 2 and allocates a cache region to the write request, the number of data included in the write request to the dirty counter 522. Further, as an example, the counter controller 524 subtracts, when a write back instruction for writing back the cache region allocated to the write request into a physical volume 61 by the cache controller 52 (write back execution unit 525) or the write back process is completed, the number of written back data from the dirty counter 522. The counter value of a target of addition and subtraction is a counter value corresponding to the RLU (for example, a physical volume 61) of the allocation or write back target of data.

The write back counter 523 is a counter for recording the number of data with regard to which a write back execution instruction to the RLU is issued for each RLU by a cache control. In other words, the write back counter 523 is an example of a second counter for counting the number of data during the write back process by the write back execution unit 525 for each physical volume 61.

As an example, the counter controller 524 adds, when the cache controller 52 (write back execution unit 525) instructs the RAID controller 55 to perform write back of dirty data to the RLU, the number of data indicated by the write back instruction to the write back counter 523. On the other hand, the counter controller 524 subtracts, when the write back is completed, the number of data whose write back is completed from the write back counter 523. The counter value of a target of the addition and the subtraction is a counter number corresponding to an RLU (for example, a physical volume 61) of the write back target.

It is to be noted that the number of data counted by each of the counters 521 to 523 described above is counted in a unit of a size with which data are managed in the cache memory 51, for example, in a unit of a cache page.

The write back execution unit 525 can execute, upon allocation of the cache memory 51 to the I/O request, a write back process on the basis of the counters 521 to 523 in addition to the periodical write back process.

For example, the write back execution unit 525 calculates, in the write back process, a use rate of the cache memory 51 for each RLU and performs the write back process when the use rate exceeds a threshold value therefor.

As an example, the write back execution unit 525 calculates a use rate of the maximum cache capacity (N) which can be allocated to the RLUs by referring to configuration information (not illustrated) of the storage apparatus 3. It is to be noted that N can be decided by calculation of 'number of data allocatable to all cache capacity of storage apparatus 3'÷'number of RLU defined in storage apparatus 3'. Here, the number of data allocatable to all cache capacity can be decided by calculation of 'size (capacity) of cache memory 51 incorporated in storage apparatus 3'÷'cache page size (data capacity)'.

Then, the write back execution unit 525 calculates a use rate of dirty data of the entire cache memory 51 (such use rate is hereinafter referred to as all dirty data use rate) by calculating ' sum total of counter values of dirty counter 522'÷'number of data allocatable to all cache capacity'.

Further, the write back execution unit 525 calculates a use rate of dirty data for each RLU (such use rate is hereinafter referred to as RLU-specific dirty data use rate) by calculating 'counter value of dirty counter 522'÷'counter value of RLU counter 521' for each RLU.

Then, if the all dirty data use rate exceeds a threshold value for the all dirty data use rate and the RLU-specific dirty data use rate exceeds a threshold value for the RLU-specific dirty data use rate, the write back execution unit 525 decides that, for the RLU, the 'write back process is to be accelerated', and starts the write back process without waiting the periodical write back process.

It is to be noted that, as the threshold value for the all dirty data use rate, a value, for example, 0.5 (dirty data occupy 50% of data which can be stored into the entire cache region) can be set. Meanwhile, as the threshold value for the RLU-specific dirty data use rate, a value, for example, 0.5 (dirty data occupy 50% of data which are using a cache region relating to an RLU for which an I/O request is received) can be set. It is to be noted that these threshold values may be used a common value. In the following description, it is assumed that a common threshold value for dirty data use rates is used as the threshold values for the all dirty data use rate and for the RLU-specific dirty data use rate.

The determination of starting of the write back process described above may be started, as an opportunity, for example, when a value is added to the dirty counter 522, or in other words, when writing is performed into a cache region in response to a write request. Further, the RLU that becomes a target of the determination may be limited to an RLU of a target of an I/O request.

It is to be noted that, in the determination of the dirty data use rates by the write back execution unit 525, calculation and determination regarding the all dirty data use rate may be skipped (may be omitted).

In this manner, the write back execution unit 525 is an example of a determination unit which determinates, in response to reception of a first access request, whether or not a first ratio of the counter value of the dirty counter 522 corresponding to a first physical volume 61 of a target of the first access request to the number, which the counter value of the RLU counter 521, for example, of data allocated already to the cache memory 51 into the first physical volume 61 exceeds a first threshold value. Further, the write back execution unit 525 as an example of the determination unit can determine, in response to reception of the first access request, whether or not a second ratio of the total value of the counter values of the dirty counter 522 to the number of data allocatable from the cache memory 51 exceeds a given threshold value.

Further, the write back counter 523 is an example of the write back processing unit which performs, when the first ratio exceeds the first threshold value, or when the first ratio exceeds the first threshold value and the second ratio exceeds the given threshold value, the write back process of data from the cache memory 51 into the first physical volume 61.

By the processes described above, the write back process can be performed before depletion of the cache region, and a delay of the allocation time of a cache region to an I/O request can be suppressed.

Further, upon completion of write back, data remain in the cache memory 51. Consequently, where the threshold value for the dirty data use rate is, for example, set to approximately 0.5, decrease of staged (cached) data which arises because discharge of data occurs when the dirty data is equal to or smaller than 50% with respect to the capacity of the cache memory 51 can be suppressed. Accordingly, the cache memory 51 can be used efficiently, for example, by 100%, and deterioration of the cache hit rate can be suppressed. Further, upon discharge of data from the cache memory 51, a region for which write back need not be performed can be increased and the waiting time taken for allocation of the cache memory 51 when a new I/O request is received can be reduced.

Incidentally, in the write back process described above, when the number of commands to an RLU exceeds an amount with which a delay can occur in performance of the RLU, the write back execution unit 525 can perform a load dispersion process for switching the write back process to a different RLU.

For example, the write back execution unit 525 monitors the write back counter 523 for each RLU and switches a write back target to a different RLU of a lower load if the counter value for the RLU for which the write back process is to be performed exceeds the threshold value for the write back number.

It is to be noted that the threshold value for the write back number represents a number of commands with which a command for instructing an RLU can have an influence on the performance of the RLU, and a value of, for example, 40 or the like can be set. In other words, the threshold value for the write back number is decided on the basis of the write performance of data into the physical volume 61.

As described above, the write back execution unit 525 as an example of the determination unit can determine whether or not the counter value of the write back counter 523 corresponding to the first physical volume 61 exceeds the second threshold value.

Further, when the counter value of the write back counter 523 corresponding to the first physical volume 61 exceeds the second threshold value, the write back execution unit 525 as an example of the write back processing unit can suppress the write back process for the first physical volume 61. Then, the write back execution unit 525 can perform the write back process of data from the cache memory 51 into the second physical volume 61 corresponding to the write back execution unit 525 in which the counter value is equal to or lower than the second threshold value.

Consequently, concentration of the load to the RLU (high load state) by the write back process can be suppressed, and occurrence of a delay of the write back process caused by a processing delay in the RLU can be suppressed.

It is to be noted that the threshold values described hereinabove are not limited to the values given hereinabove but may be suitably decided in accordance with various conditions such as the apparatus configuration, the mode of operation and so forth and set to the CM 5 in advance before operation is started. Further, the threshold values may be changed by the CM 5, an operator or the like in the course of the operation.

Further, in the write back process, an instruction to cause data stored in a cache page of a write back target to be written into a physical volume 61 is issued to the RAID controller 55. Further, the write back by the RAID controller 55 can be performed by various known techniques, and detailed description of the same is omitted herein.

Furthermore, in the periodical write back process, the write back execution unit 525 can start a timer for the write back for each data at a timing at which use of data by the host I/O comes to an end and perform the write back process of the data when the timer indicates time-up.

Now, an example of a case in which the storage apparatus 3 fails to secure a cache region for an I/O request therein, or in other words, in which the storage apparatus 3 is in a cache full state and besides has no dirty region, is described with reference to FIG. 7. It is to be noted that it is assumed that the threshold value for the write back number is "2" for the convenience of description.

Figure 7:
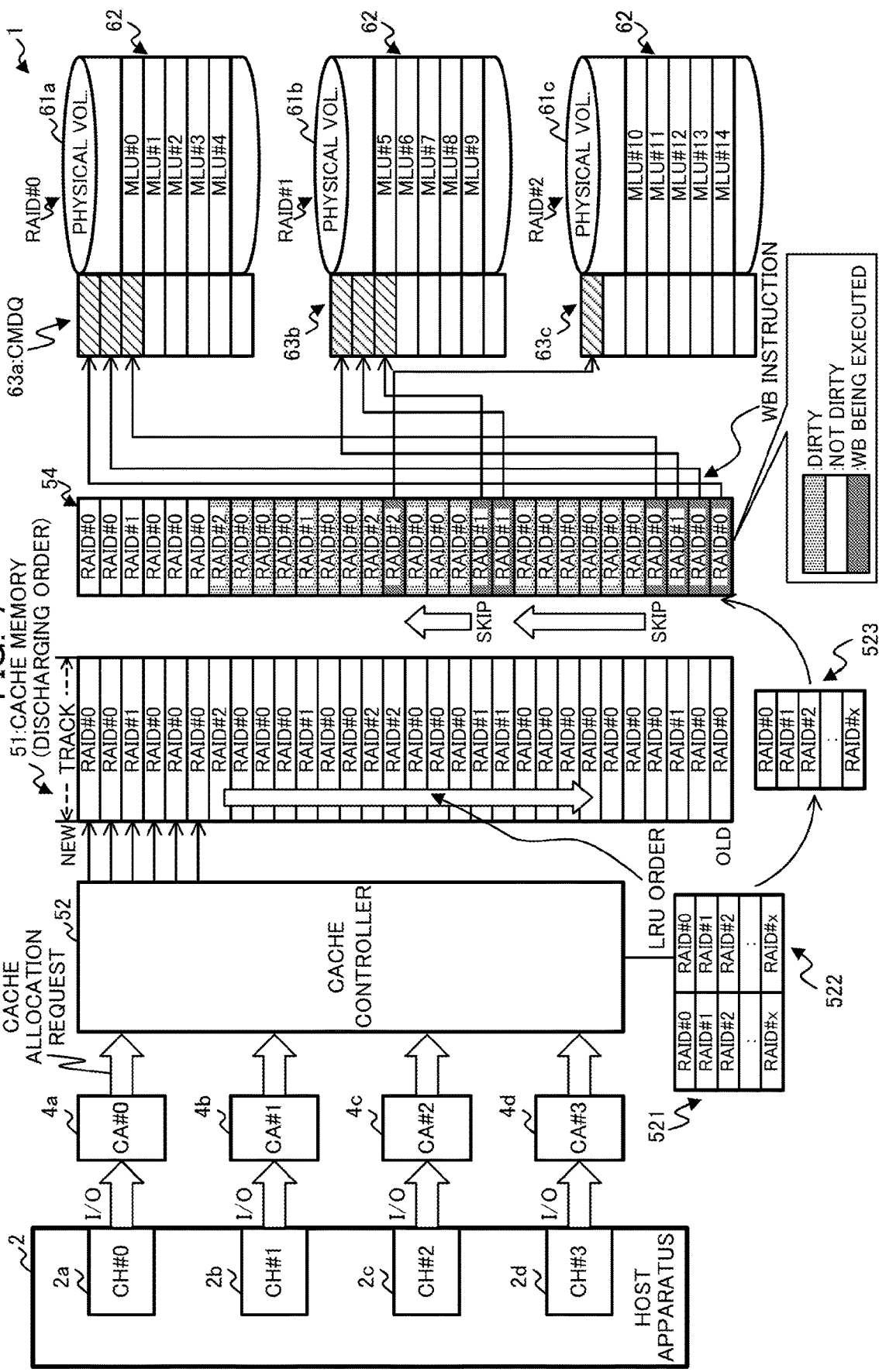
FIG. 7 is a view illustrating an example in which a storage apparatus according to the embodiment fails to secure a cache region for an I/O request.

As depicted in FIG. 7, if an I/O request is issued, for example, from the CH 2a of the host apparatus 2, then the CA 4a of the storage apparatus 3 issues a cache allocation request to the cache controller 52 of the CM 5. When the write back execution unit 525 allocates a cache memory 51 to the I/O request, if no free region is available, then the write back execution unit 525 issues a write back instruction of dirty data into an RLU that exhibits a high all dirty data use rate and a high RLU-specific dirty data use rate of the cache region and upon which the load is low.

For example, as depicted in FIG. 7, if the write back execution unit 525 determines, on the basis of the RLU counter 521 and the dirty counter 522, that the all dirty data use rate and the RLU-specific dirty data use rate regarding the RAID #0, RAID #1 and RAID #2 exceed the individual threshold values therefor, then the write back execution unit 525 performs the following process.

When dirty data of the cache memory 51 are discharged in the LRU order, the write back execution unit 525 performs such control, on the basis of the RLU-specific write back counter 523 of each RLU, that the count value with regard to the RLU of a target for issuance of a write back instruction does not exceed the threshold value for the write back number.

As an example, the write back execution unit 525 instructs to write back of dirty data of the RAID #0, RAID #0, RAID #1 and RAID #0 in the LRU order in the dirty table (in order from below to above of the dirty table 54 of FIG. 7). It is to be noted that, for the write back counter 523, the RAID #0 is updated to "3" and the RAID #1 is updated to "1".

Then, the write back execution unit 525 suppresses write back of data of the fifth RAID #0 from below because the write back counter 523 of the RAID #0 of the data exceeds "2" which is the threshold value for the write back number. Similarly, the write back execution unit 525 suppresses also write back of data of the sixth to tenth RAIDs #0 from below.

Meanwhile, with regard to the eleventh to twelfth RAIDs #1 from below, since the write back counter 523 of the RAID #1 is "1" and is smaller than the threshold value for the write back number, the write back execution unit 525 issues a write back instruction for the data of the RAID #1.

In this manner, the write back execution unit 525 not selects a target LRU and target data for the write back process uniformly in accordance with the LRU table 53 but can select data with which the RLU is not placed into a high load state.

As described above, with the storage apparatus 3 according to the embodiment, for each RLU, the use rate of the cache memory 51 and the load on the RLU are monitored, and if the RLU of the write back target is in a high load state, then the write back process for an RLU of a lower load can be switchably performed.

Consequently, it is possible for a write back instruction not to be issued excessively to an RLU and it is possible to reduce the load on the RLU. Therefore, even if write back contends, for example, with a readout operation for staging or the like in an RLU, the RLU can be managed so as to moderate the performance deterioration.

Accordingly, although occurrence of a delay may possibly occur in the comparative example described hereinabove, occurrence of a delay of the allocation waiting time of the cache memory 51 by a deviation of the RLU of the write back target can be suppressed. Consequently, occurrence of an allocation delay of the cache memory 51 in regard to an access request in the storage apparatus 3 can be suppressed.

[2-3] Example of Operation of Storage System

Now, an example of operation of the storage system 1 configured in such a manner as described above is described with reference to FIGS. 8 to 12.

First, an example of operation of the entire in the storage system 1 is described with reference to FIG. 8. If an I/O is generated in the host apparatus 2 and an I/O request is issued, for example, from the CH 2a (process T1), then, for example, the CA 4a of the storage apparatus 3 receives the I/O request and issues an allocation request of a cache to the cache controller 52 (process T2).

Figure 9:
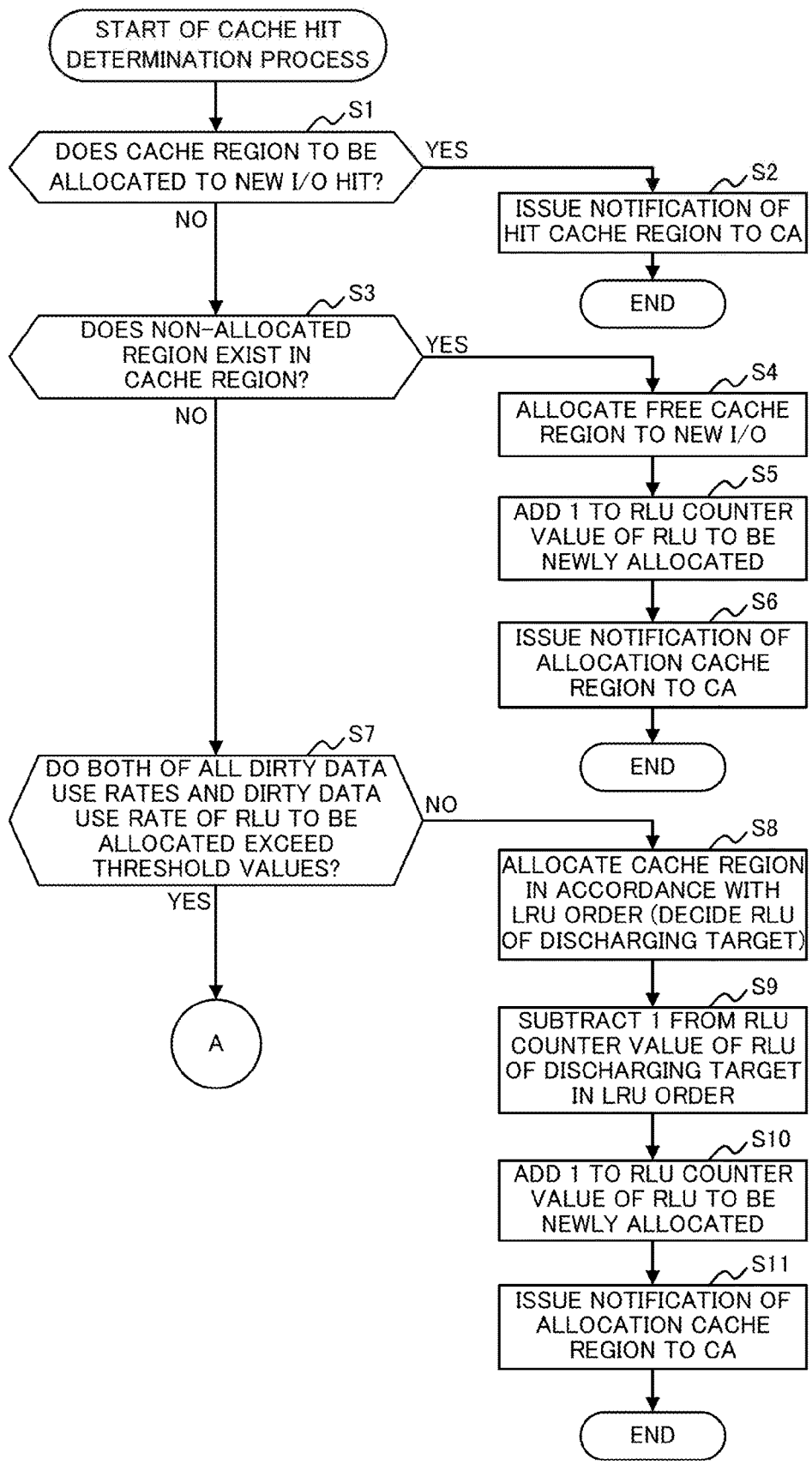
FIGS. 9 and 10 are flow charts illustrating examples of operation for a determination process of a cache hit by a cache controller according to the embodiment.
Figure 10:
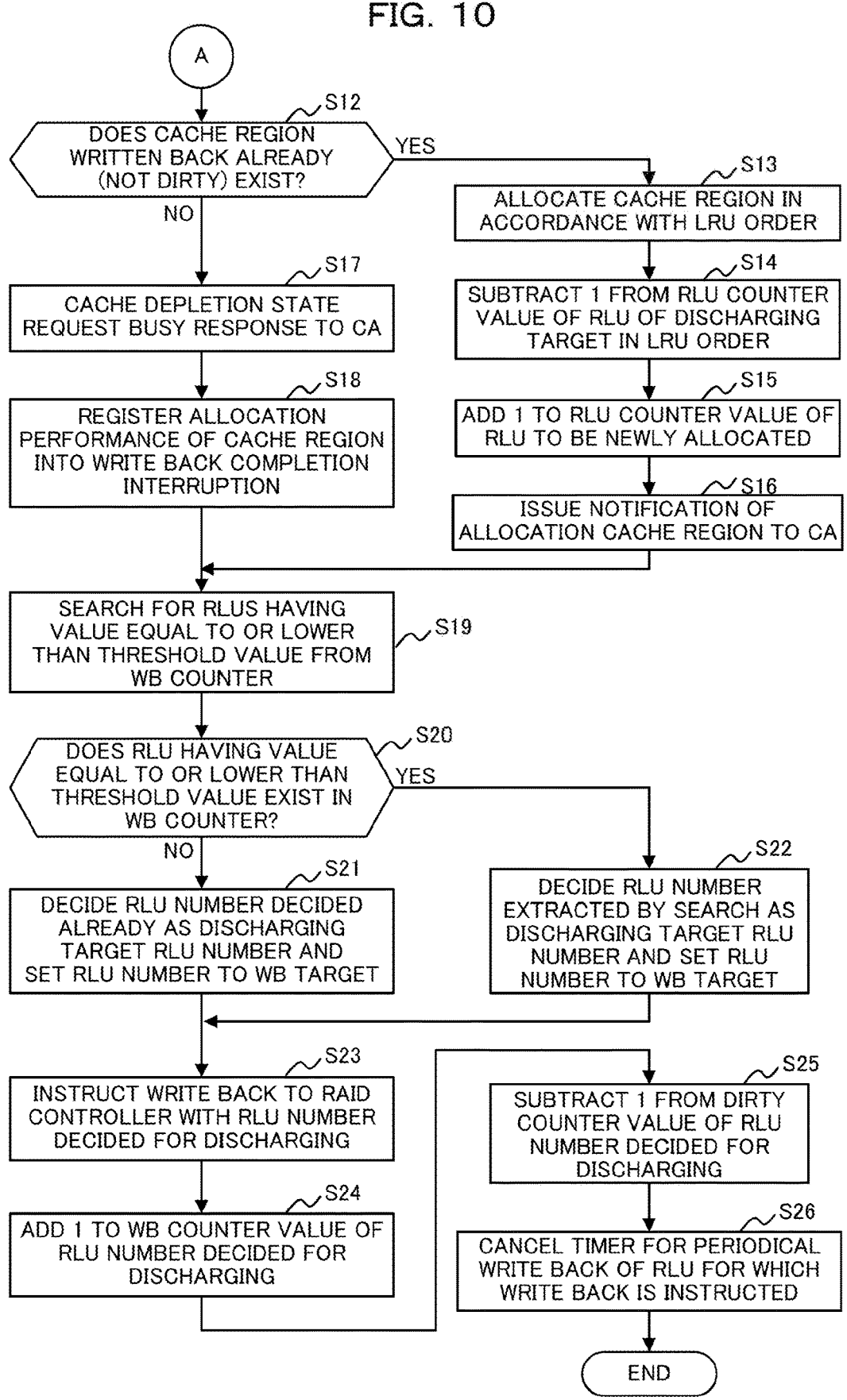

The cache controller 52 performs a cache hit determination process (process T3, refer to FIGS. 9 and 10). Then, if the cache controller 52 results in success in cache allocation, then it notifies the CA 4a of a region of the cache memory 51 to be allocated to the I/O request (process T4).

The CA 4a performs data access to the cache memory 51 on the basis of the host I/O through the cache controller 52 in response to the notification from the cache controller 52 (process T5). If the host I/O is a write request, then the update of data in the cache memory 51 is performed. It is to be noted that the CA 4a may acquire data (write data) relating to the I/O request from the CH 2a in advance or may acquire data from the CH 2a when it receives the notification of the process T4.

When the access to the cache memory 51 comes to an end, the CA 4a returns a response to the CH 2a, and if the CA 4a receives an end notification of the host I/O from the CH 2a (process T6), then the CA 4a notifies the cache controller 52 of release of the used region of the cache memory 51 (process T7). It is to be noted that, when the CA 4a performs data update of the cache memory 51, the CA 4a notifies the cache controller 52 that data update is performed.

Figure 11:
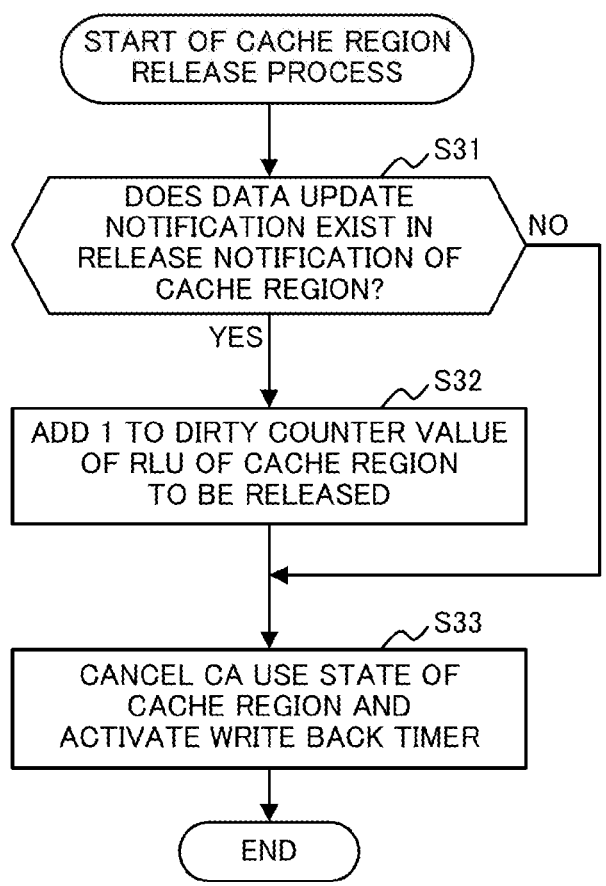
FIG. 11 is a flow chart illustrating an example of operation for a release process of a cache region by the cache controller according to the embodiment.

When the notification is received from the CA 4a, the cache controller 52 performs a release process of the cache region (process T8, refer to FIG. 11).

When the cache controller 52 is to perform the periodical write back process or the write back process arising from increase of the dirty data use rate, it instructs the RAID controller 55 to write back of data in the cache memory 51 into a physical disk of the physical volume 61 (process T9).

The RAID controller 55 performs write back of data indicated in the notification from the cache controller 52 into the physical volume 61 (process T10). Then, when the write back comes to completion, the RAID controller 55 notifies the cache controller 52 of completion of write back (process T11).

When the completion notification of write back is received from the RAID controller 55, the cache controller 52 performs an interrupt process of the write back completion (process T12, refer to FIG. 12), thereby ending the processing.

Now, an example of operation of the determination process of a cache hit (refer to process T3 in FIG. 8) by the cache controller 52 is described with reference to FIGS. 9 and 10.

If a new command for an I/O request from the host apparatus 2 is received, for example, from the CA 4a, then the cache controller 52 determines whether or not a cache region to be allocated to the I/O request is hit, or in other words, whether or not data included in the instruction of the I/O request hits in a cache region (step S1). It is to be noted that the determination of a cache hit can be implemented by various known techniques, and detailed description of the same is omitted herein.

If the cache region is hit (Yes route at step S1), then the cache controller 52 notifies (issues a response to) the CA 4a of information of the hit cache region, for example, a hit memory address (step S2). Then, the cache hit determination process by the cache controller 52 is ended.

On the other hand, if the cache region is not hit (No route at step S1), then the cache controller 52 performs confirmation of a depletion state of the cache and then determines whether or not a non-allocated region (free region) exists in the cache region (step S3). If the non-allocated region exists (Yes route at step S3), then the cache controller 52 allocates a free cache region to the new I/O request (step S4). Further, the counter controller 524 adds 1 to the counter value of the RLU counter 521 of an RLU, which is a target of the I/O request (step S5). Then, the cache controller 52 notifies the CA 4a of information of the allocated cache region (step S6). Then, the determination process of a cache hit by the cache controller 52 is ended.

If the non-allocated region does not exist in the cache region (No route at step S3), the write back execution unit 525 refers to the RLU counter 521 and the dirty counter 522 to calculate a dirty data use rate. For example, the cache controller 52 calculates a dirty data use rate of the entire cache memory 51 and an RLU-specific dirty data use rate of the RLU relating to the I/O request.

Then, the write back execution unit 525 determines whether or not both of the calculated all dirty data use rate and RLU-specific dirty data use rate exceed the threshold values for the dirty data use rates, for example, 50% (step S7).

The all dirty data use rate can be decided by calculation of, for example, 'sum total of counter values of dirty counter 522'÷'number of data storable into cache memory 51'. Meanwhile, the RLU-specific dirty data use rate can be decided by calculation of, for example, 'counter value of dirty counter 522'÷'counter value of RLU counter 521', of the RLU relating to the I/O request.

It is to be noted that the write back execution unit 525 may perform, without performing calculation of the all dirty data use rate, calculation of the RLU-specific dirty data use rate of the RLU relating to the I/O request and determine whether or not the calculated RLU-specific dirty data use rate exceeds the threshold value therefor.

At step S7, if the all dirty data use rate or the RLU-specific dirty data use rate is equal to or lower than the threshold value therefor (No route at step S7), then the cache controller 52 allocates a cache region to the I/O request in accordance with an order indicated by the LRU table 53 (step S8). It is to be noted that, at step S8, the cache controller 52 decides an RLU corresponding to data stored in the cache region written back already (not dirty), which indicates the oldest update in the LRU order, as an RLU of a discharging target.

Further, the counter controller 524 subtracts 1 from the counter value of the RLU counter 521 of the RLU of the discharging target in the LRU order (step S9) and adds 1 to the counter value of the RLU counter 521 of the RLU which is the target of the I/O request (step S10). Then, the cache controller 52 notifies the CA 4a of information of the allocated cache region (step S11). Then, the cache hit determination process by the cache controller 52 is ended.

On the other hand, if both of the all dirty data use rate and the RLU-specific dirty data use rate exceed the respective threshold values (Yes route at step S7), then the processing advances to step S12 of FIG. 10.

At step S12 of FIG. 10, the write back execution unit 525 determines whether or not a cache region for which write back has been performed exists. If a cache region for which write back has been performed exists (Yes route at step S12), then the cache controller 52 allocates a cache region to the I/O request in accordance with the order indicated by the LRU table 53 (step S13). Further, the counter controller 524 subtracts 1 from the counter value of the RLU counter 521 of the RLU of the discharging target in the LRU order (step S14), and adds 1 to the counter value of the RLU counter 521 of the RLU which is the target of the I/O request (step S15). Then, the cache controller 52 notifies the CA 4a of information of the allocated cache region (step S16) and then advances the processing to step S19.

On the other hand, if a cache region for which back write has been performed does not exist at step S12 (No route at step S12), the cache controller 52 notifies the CA 4a of a busy state since a region for which write back has been performed does not exist in the cache region (step S17). Consequently, the host apparatus 2 is notified that the cache region is in a free region waiting state.

Further, the cache controller 52 registers performance of allocation and notification of a cache region as the interrupt process when the write back process is completed in order to perform allocation of a cache region in response to the current I/O request upon completion of the write back (step S18). Then, the processing advances to step S19.

At steps S19 to S22, since it is determined at step S7 that the dirty region for which write back is not performed as yet exceeds the threshold value for the dirty data use rate, the write back execution unit 525 decides a cache region for which write back is to be performed in order to change the write back target to a different RLU. In other words, the processes at steps S19 to S22 correspond to the load dispersion process by the write back execution unit 525.

For example, at step S19, the write back execution unit 525 searches for an RLU whose write back number is equal to or smaller than the threshold value from the write back counter 523. Then, the write back execution unit 525 determines whether or not an RLU whose write back number is equal to or smaller than the threshold value therefor exists in the write back counter 523 (step S20).

If an RLU whose write back number is equal to or smaller than the threshold value does not exist (No route at step S20), then this signifies that all RLUs are in a high load state. Accordingly, the write back execution unit 525 decides the decided RLU number as the RLU number of the discharging target and sets the RLU of the RLU number as a write back target (step S21) and then advances the processing to step S23. It is to be noted that, at step S21, the write back execution unit 525 may set an RLU whose write back counter 523 indicates the lowest value as a write back target.

On the other hand, if an RLU whose write back number is equal to or smaller than the threshold value exists (Yes route at step S20), then the write back execution unit 525 decides the RLU number detected by the search at step S19 as the RLU number of the discharging target and sets the RLU of the RLU number as a write back target (step S22). Thereafter, the processing advances to step S23.

Figure 8:
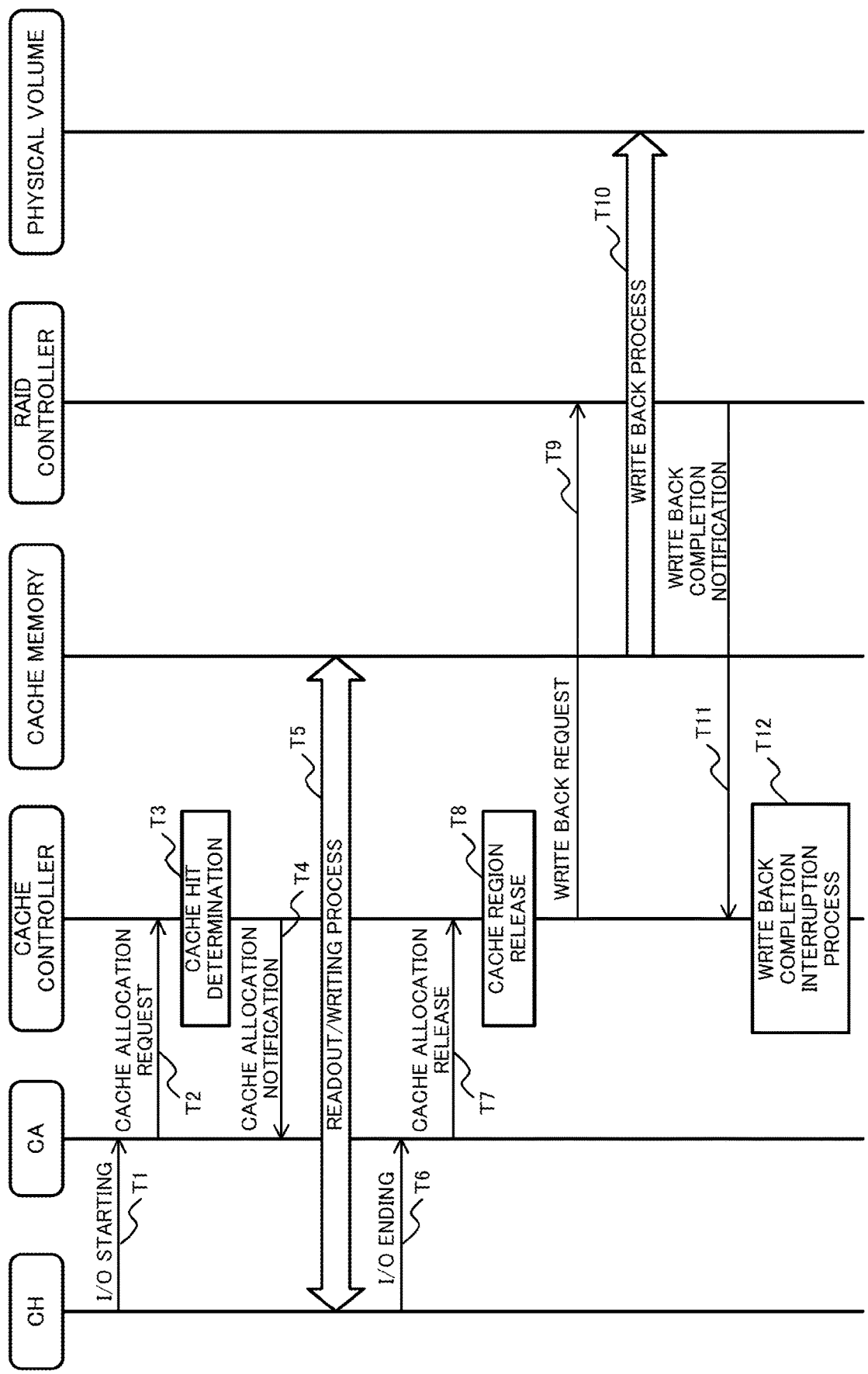
FIG. 8 is a sequence diagram illustrating an example of operation of the entire storage system according to the embodiment.

At step S23, the write back execution unit 525 notifies the RAID controller 55 of the RLU number decided as the discharging target and instructs the RAID controller 55 to perform write back regarding the RLU of the RLU number (refer to process T9 of FIG. 8).

Further, the counter controller 524 adds 1 to the counter value of the write back counter 523 of the RLU of the discharging target (step S24) and subtracts 1 from the counter value of the dirty counter 522 of the RLU of the discharging target (step S25).

Then, the write back execution unit 525 cancels the timer for the periodical write back process for a cache page of the cache memory 51 relating to the data of the RLU to which the write back instruction has been issued (step S26). Thereafter, the determination process of a cache hit by the cache controller 52 is ended.

Now, an example of operation of a release process of a cache region (refer to process T8 of FIG. 8) by the cache controller 52 in response to a notification from the CA 4a after issuance of a notification of information of a cache region to the CA 4a is described with reference to FIG. 11.

If the cache controller 52 receives a release notification of a cache region from the CA 4a, then it decides whether or not an update notification of data exists in the notification, for example, whether or not an update notification of data is included in the notification (step S31).

If an update notification of data does not exist (No route at step S31), then the processing advances to step S33. On the other hand, if an update notification of data exists (Yes route at step S31), then the counter controller 524 adds 1 to the counter value of the dirty counter 522 of the RLU of the cache region included in the notification from the CA 4a (step S32).

Then, the cache controller 52 changes the state of the cache region, whose release notification has been received, from a used state to a non-used state by the CA 4a and activates the timer for the periodical write back process (step S33), and then the processing is ended. It is to be noted that the state of the cache region is information set, for example, in the LRU table 53 and may be set to a used state, for example, when the cache controller 52 issues an allocation notification of a cache region to the CA 4a.

Figure 12:
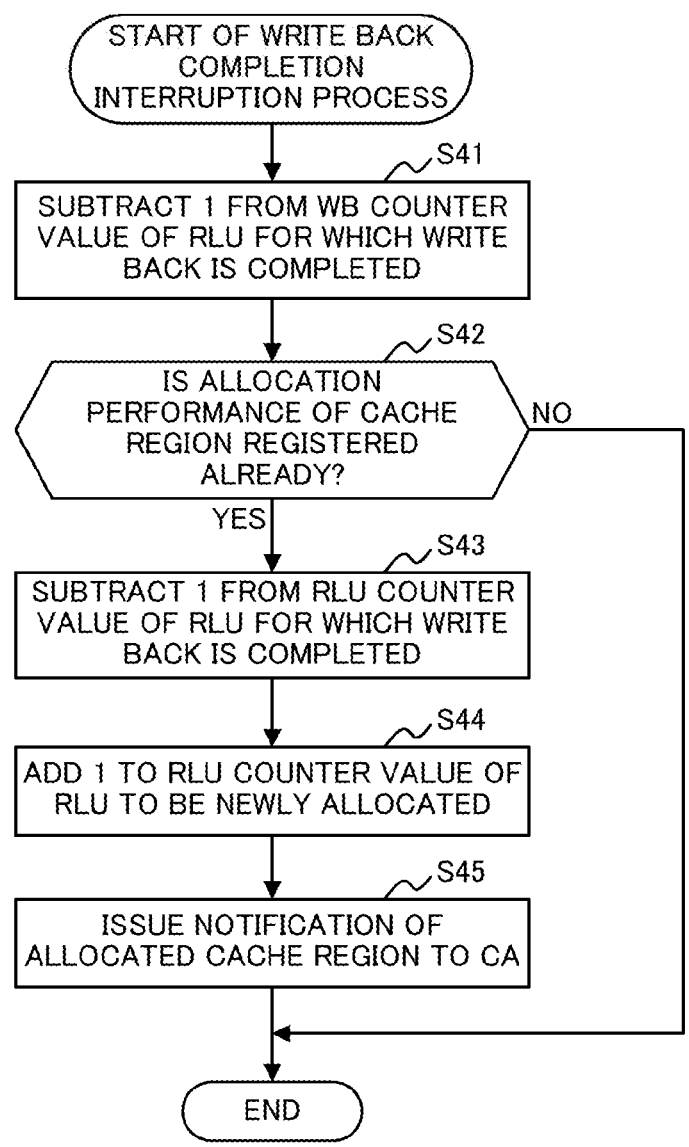
FIG. 12 is a flow chart illustrating an example of operation for an interrupt process upon completion of write back by the cache controller according to the embodiment.

Now, an example of operation of the interrupt process (refer to process T12 of FIG. 8) upon completion of write back in the write back process by the cache controller 52 is described with reference to FIG. 12.

If a completion notification of write back is received from the RAID controller 55, then the counter controller 524 subtracts 1 from the counter value of the write back counter 523 of the RLU for which write back is completed (step S41).

Then, the cache controller 52 determines whether or not performance and notification of allocation of a cache region are registered already (step S42). It is to be noted that registration of performance and notification of allocation can be performed at step S18 of FIG. 10. If performance and notification of allocation are not registered as yet (No route step S42), then the processing is ended.

On the other hand, if performance and notification of allocation are registered already (Yes route at step S42), then the counter controller 524 subtracts 1 from the counter value of the RLU counter 521 of the RLU for which the write back is completed (step S43). Further, the counter controller 524 adds 1 to the counter value of the RLU counter 521 of the RLU to which the new I/O request is to be allocated (step S44).

Then, the cache controller 52 notifies the CA 4a of information of the allocated cache region in order to report the completion of allocation of a cache region to the host apparatus 2 (step S45), thereby ending the processing.

[2-4] Example of Hardware Configuration

Now, an example of a hardware configuration of the CM 5 configured in such a manner as described above is described with reference to FIG. 13.

As depicted in FIG. 13, the CM 5 includes a CPU 5a, a memory 5b, a storage unit 5c, an interface unit 5d, and an I/O unit 5e.

The CPU 5a is an example of a processor which performs various controls and arithmetic operations. The CPU 5a may be coupled for mutual communication with the blocks in the CM 5 by a bus. It is to be noted that, as the processor, the CPU 5a may be replaced by a different arithmetic processing device such as, for example, an Integrated Circuit (IC) such as a Micro Processing Unit (MPU).

The memory 5b is an example of hardware for storing various data and programs. The cache memory 51 depicted in FIG. 6 may be implemented by a storage region the memory 5b has. Further, the memory 5b may have a storage region for storing various kinds of information of the LRU table 53 and the dirty table 54 illustrated in FIG. 6. As the memory 5b, a volatile memory such as, for example, a RAM is available.

The storage unit 5c is an example of hardware for storing various data, programs and so forth. As the storage unit 5c, various storage apparatus such as, for example, a magnetic disk apparatus such as an HDD, a semiconductor drive device such as an SSD, a nonvolatile memory such as a flash memory or a Read Only Memory (ROM) are available.

For example, the storage unit 5c may store a storage controlling program 50 for implementing all or part of various functions of the CM 5. In this case, the functions of the CM 5 can be implemented by the CPU 5a developing the storage controlling program 50 stored in the storage unit 5c into the memory 5b and executing the storage controlling program 50.

The interface unit 5d is an example of a communication interface for performing coupling and control of communication and so forth with the host apparatus 2, DE 6 or a management server or the like not depicted. It is to be noted that, although the CA 4 in the example of FIG. 6 is provided outside the CM 5, the CA 4 may be implemented by the interface unit 5d of the CM 5. As the interface unit 5d, for example, a network interface such as a LAN card, an interface in compliance with Serial Attached SCSI (Small Computer System Interface) (SAS), Fibre Channel (FC), InfiniBand and so forth are available.

Further, the interface unit 5d may include a reading unit for reading out data and programs recorded in a recording medium 5f. The reading unit may include a coupling terminal or apparatus to or into which a computer-readable recording medium 5f can be coupled or inserted. As the reading unit, for example, an adapter in compliance with Universal Serial Bus (USB) or the like, a drive apparatus for performing access to a recording disk, a card reader for performing access to a flash memory such as an SD card and so forth are available. It is to be noted that the storage controlling program 50 may be stored in the recording medium 5f.

The I/O unit 5e can include at least some of inputting units such as a mouse, a keyboard and an operation button and outputting units such as a display unit. For example, an inputting unit may be used for such works as registration or change of settings by an operator or the like, various operations such as selection (switching) of a mode of the system or inputting of data, and an outputting unit may be used for confirmation of setting by an operator or the like or outputting of various notifications.

It is to be noted that the hardware configuration of the CM 5 described above is exemplary. Accordingly, increase or decrease (for example, addition or omission of an arbitrary block or blocks), division, or integration in an arbitrary combination of hardware, addition or omission of a bus or buses and so forth between the storage apparatus 3 and the CM 5 or in the CM 5 may be performed suitably.

[Others]

The technology relating to the embodiment described above can be carried out in such modified or altered forms as described below.

For example, the functional blocks of the CM 5 of the storage apparatus 3 depicted in FIG. 6 may be merged or divided in an arbitrary combination.

Further, while the storage apparatus 3 includes three physical volumes 61 as an example of an RAID group, the storage apparatus 3 is not limited to this and may include a number of physical volumes 61 equal to or less than two or equal to or greater than four, each including one or more physical disks.

According to an aspect, occurrence of an allocation delay of a cache memory to an access request in the storage apparatus can be suppressed.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage controlling apparatus, comprising:
a processor configured to:
control a plurality of first counters configured to count, among data stored in a cache memory and relating to an access request, a number of data which are not written in storage volumes of a target of the access request, for each storage volume;
determine, in response to reception of a first access request, whether a first ratio of a counter value of one of the plurality of first counters to a number of allocated data allocated already to the cache memory exceeds a first threshold value, the allocated data being related to the access request to a first storage volume, the counter value of the one of the plurality of first counters corresponding to the first storage volume which is a target of the first access request, the first access request being a writing request or a reading request for the first storage volume;
determines, in response to the reception of the first access request, whether a second ratio of a total count of the counter values of the plurality of first counters to a number of data allocatable to the cache memory exceeds a given threshold value; and
execute a write back process to write back data from the cache memory into the first storage volume where the first ratio exceeds the first threshold value and the second ratio exceeds the given threshold value, the write back data being unwritten data related to the first storage volume.

2. The storage controlling apparatus according to claim 1, wherein the processor:
controls a second counter configured to count a number of data during a write back process for each storage volume;
determines whether or not a counter value of the second counter corresponding to the first storage volume exceeds a second threshold value; and
suppresses, where the counter value of the second counter corresponding to the first storage volume exceeds the second threshold value, the write back process into the first storage volume and executes a write back process to write back data from the cache memory into a second storage volume corresponding to the second counter whose counter value is equal to or lower than the second threshold value.

3. The storage controlling apparatus according to claim 2, wherein the second threshold value is decided based on a writing performance of data into the storage volume.

4. The storage controlling apparatus according to claim 1, wherein the processor:
controls a third counter configured to count a number of data allocated already to the cache memory for each storage volume;
determines whether or not the first ratio of the one of the plurality of first counters corresponding to the first storage volume to a counter value of the third counter corresponding to the first storage volume exceeds the first threshold value; and
executes a write back process to write back data from the cache memory into the first storage volume where the first ratio exceeds the first threshold value.

5. A non-transitory computer-readable recording medium having stored therein a storage controlling program for causing a computer to execute a process comprising:
controlling a plurality of first counters configured to count, among data stored in a cache memory and relating to an access request, a number of data which are not written in storage volumes of a target of the access request, for each storage volume;
determining, in response to reception of a first access request, whether a first ratio of a counter value of one of the plurality of first counters to a number of allocated data allocated already to the cache memory exceeds a first threshold value, the allocated data being related to the access request to a first storage volume, the counter value of the one of the plurality of first counters corresponding to the first storage volume which is a target of the first access request, the first access request being a writing request or a reading request for the first storage volume;
determining, in response to the reception of the first access request, whether a second ratio of a total count of the counter values of the plurality of first counters to a number of data allocatable to the cache memory exceeds a given threshold value; and
executing a write back process to write back data from the cache memory into the first storage volume where the first ratio exceeds the first threshold value and the second ratio exceeds the given threshold value, the write back data being unwritten data related to the first storage volume.

6. The non-transitory computer-readable recording medium according to claim 5, wherein the process further comprises:
controlling a second counter configured to count a number of data during the write back process for each storage volume;
determining whether or not a counter value of the second counter corresponding to the first storage volume exceeds a second threshold value; and
suppressing, where the counter value of the second counter corresponding to the first storage volume exceeds the second threshold value, the write back process into the first storage volume and executing a write back process to write back data from the cache memory into a second storage volume corresponding to the second counter whose counter value is equal to or lower than the second threshold value.

7. The non-transitory computer-readable recording medium according to claim 6, wherein the second threshold value is decided based on a writing performance of data into the storage volume.

8. The non-transitory computer-readable recording medium according to claim 5, wherein the process further comprises:
controlling a third counter configured to count a number of data allocated already to the cache memory for each storage volume;
determining whether or not the first ratio of the one of the plurality of first counters of the first counter corresponding to the first storage volume to a counter value of the third counter corresponding to the first storage volume exceeds the first threshold value; and
executing a write back process to write back data from the cache memory into the first storage volume where the first ratio exceeds the first threshold value.

9. A storage controlling method, comprising:
controlling a plurality of first counters configured to count, among data stored in a cache memory and relating to an access request, a number of data which are not written in storage volumes of a target of the access request, for each storage volume;
determining, in response to reception of a first access request, whether a first ratio of a counter value of one of the plurality of first counters to a number of allocated data allocated already to the cache memory exceeds a first threshold value, the allocated data being related to the access request to a first storage volume, the counter value of the one of the plurality of first counters corresponding to the first storage volume which is a target of the first access request, the first access request being a writing request or a reading request for the first storage volume;
determining, in response to the reception of the first access request, whether a second ratio of a total count of the counter values of the plurality of first counters to a number of data allocatable to the cache memory exceeds a given threshold value; and
executing a write back process to write back data from the cache memory into the first storage volume where the first ratio exceeds the first threshold value and the second ratio exceeds the given threshold value, the write back data being unwritten data related to the first storage volume.

10. The storage controlling method according to claim 9, wherein
controlling a second counter configured to count a number of data during a write back process for each storage volume;
determining whether or not a counter value of the second counter corresponding to the first storage volume exceeds a second threshold value; and
suppressing, where the counter value of the second counter corresponding to the first storage volume exceeds the second threshold value, the write back process into the first storage volume and executing a write back process to write back data from the cache memory into a second storage volume corresponding to the second counter whose counter value is equal to or lower than the second threshold value.

11. The storage controlling method according to claim 10, wherein the second threshold value is decided based on a writing performance of data into the storage volume.

12. The storage controlling method according to claim 9, wherein
controlling a third counter configured to count a number of data allocated already to the cache memory for each storage volume;
determining whether or not the first ratio of the counter value of the one of the plurality of first counters corresponding to the first storage volume to a counter value of the third counter corresponding to the first storage volume exceeds the first threshold value; and executing a write back process to write back data from the cache memory into the first storage volume where the first ratio exceeds the first threshold value.

* * * * *